(12) United States Patent
Mathiszik et al.

(10) Patent No.: US 7,633,834 B2
(45) Date of Patent: Dec. 15, 2009

(54) VSP PATTERN RECOGNITION IN ABSOLUTE TIME

(75) Inventors: Holger Mathiszik, Eicklingen (DE); Graham A. Gaston, Aberdeen (GB); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 37 days.

(21) Appl. No.: 11/937,412

(22) Filed: Nov. 8, 2007

(65) Prior Publication Data

US 2009/0034366 A1 Feb. 5, 2009

Related U.S. Application Data

(63) Continuation-in-part of application No. 11/830,074, filed on Jul. 30, 2007, now Pat. No. 7,389,184.

(51) Int. Cl.
  *G01V 1/00* (2006.01)
(52) U.S. Cl. .................................................. 367/57
(58) Field of Classification Search .................. 367/27, 367/38, 55, 56, 57; 181/102, 105
  See application file for complete search history.

(56) References Cited

U.S. PATENT DOCUMENTS

| | | | |
|---|---|---|---|
| 3,159,232 A | 12/1964 | Fair | 181/0.5 |
| 3,701,968 A | 10/1972 | Broding | 340/17 |
| 3,727,717 A | 4/1973 | Miller | 181/0.5 VM |
| 4,739,858 A | 4/1988 | Dragoset, Jr. | 181/115 |
| 4,896,303 A | 1/1990 | Leslie et al. | 367/35 |
| 4,918,668 A | 4/1990 | Sallas | 367/22 |
| 5,012,453 A | 4/1991 | Katz | 367/57 |
| 5,109,947 A | 5/1992 | Rector, III | 181/106 |
| 5,111,437 A | 5/1992 | Rice | 367/57 |
| 5,579,283 A | 11/1996 | Owens et al. | 367/83 |
| 5,585,556 A | 12/1996 | Petersen et al. | 73/152.03 |
| 5,684,693 A | 11/1997 | Li | 702/6 |
| 5,901,113 A | 5/1999 | Masak et al. | 367/57 |
| 5,924,499 A | 7/1999 | Birchak et al. | 175/40 |
| 5,955,966 A | 9/1999 | Jeffryes et al. | 340/853.1 |
| 5,963,138 A | 10/1999 | Gruenhagen | 340/679 |
| 6,002,642 A | 12/1999 | Krebs | 367/73 |
| 6,023,444 A | 2/2000 | Naville et al. | 367/82 |
| 6,078,868 A | 6/2000 | Dubinsky | 702/6 |
| 6,094,401 A | 7/2000 | Masak et al. | 367/84 |
| 6,196,335 B1 | 3/2001 | Rodney | 175/40 |
| 6,308,137 B1 * | 10/2001 | Underhill et al. | 702/9 |
| 6,584,406 B1 | 6/2003 | Harmon et al. | 702/6 |
| 6,717,501 B2 | 4/2004 | Hall et al. | 336/132 |

(Continued)

*Primary Examiner*—Jack W. Keith
*Assistant Examiner*—Krystine Saito
(74) *Attorney, Agent, or Firm*—Madan & Sriram, P.C.

(57) ABSTRACT

A procedure to determine VSP-WD (Vertical Seismic Profiling—While Drilling) first breaks in absolute time is described. By combining a seismic surface source and firing complex seismic pattern unique in time (with a highly accurate surface—downhole time reference system), an automatic downhole procedure for first break detection on the downhole data, even under harsh conditions (low signal to noise ratio), is established. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(*b*).

19 Claims, 9 Drawing Sheets

U.S. PATENT DOCUMENTS

| | | |
|---|---|---|
| 6,837,105 B1 | 1/2005 | DiFoggio et al. ......... 73/152.46 |
| 6,917,564 B2 | 7/2005 | Leaney ....................... 367/73 |
| 2005/0052949 A1* | 3/2005 | Gaston et al. ................ 367/57 |
| 2005/0285751 A1* | 12/2005 | Hall et al. ................ 340/853.1 |

* cited by examiner

VSP PATTERN RECOGNITION IN ABSOLUTE TIME

CROSS-REFERENCES TO RELATED APPLICATIONS

This application is a continuation in part of U.S. patent application Ser. No. 11/830,074 filed on Jul. 30, 2007 which is a continuation of U.S. patent application Ser. No. 10/746,072, now U.S. Pat. No. 7,274,990.

BACKGROUND OF THE DISCLOSURE

1. Field of the Disclosure

The present disclosure relates to an improved method of determining, while drilling in the earth with a drill bit, the positions of geologic formations in the earth. More particularly, it relates to a method for determining first breaks in absolute time.

2. Description of the Related Art

Conventional reflection seismology utilizes surface sources and receivers to detect reflections from subsurface impedance contrasts. The obtained image often suffers in spatial accuracy, resolution and coherence due to the long travel paths between source, reflector, and receiver. In particular, due to the two-way passage of seismic signals through a highly absorptive near surface weathered layer with a low, laterally varying velocity, subsurface images are poor quality. To overcome this difficulty, a technique commonly known as Vertical Seismic Profiling (VSP) was developed to image the subsurface in the vicinity of a borehole. With VSP, a surface seismic source is used and signals are received at a single downhole receiver or an array of downhole receivers. This is repeated for different depths of the receiver (or receiver array). In offset VSP, a plurality of spaced apart sources are sequentially activated, enabling imaging of a larger range of distances than is possible with a single source In reverse VSPs, the positions of the source and receivers are interchanged, i.e., a downhole source is used and recording is done at a surface receiver or array of receivers. A particular example of such a system is one developed by Western Atlas International Inc. and used with the service mark TOMEX®. In this, the drillbit itself is used as the seismic source. One of the problems with using a drillbit as a seismic source is that the source is not repeatable. As would be known to those versed in the art, analysis of VSP data requires the use of a repeatable source so that any waveforms changes in the VSP data may be attributable to formation changes. With the drillbit as a seismic source, this is clearly not possible. Hence it would be desirable to properly compensate for source variations prior to analysis of the VSP data.

A problem with proper compensation for source variations is that telemetry capability in a drilling environment is extremely limited, so that sending the characterizing information about the source wavelet to the surface is not possible. U.S. Pat. No. 6,078,868 to Dubinsky, having the same assignee as the present application and the contents of which are fully incorporated herein by reference, teaches a method for making seismic while drilling (SWD®) measurements in which a reference signal downhole near the drill bit is analyzed, and information about the signal is sent to the surface using a limited number of transmission bits. In one embodiment, a library of anticipated drill bit wavelets is stored in memory downhole and in memory at the surface. This library of anticipated drill bit wavelets is based on long term experience (several years) as well as theoretical considerations in collecting drill bit signals downhole and, in fact, could also be considered a data base of these collected drill bit signals. The best matching wavelet is identified by the processor downhole and then a code identifying the wavelet and a scaling factor are sent to the surface. At the surface, the best matching wavelet is retrieved based on the code received and then a reconstructed signal is created using the retrieved wavelet and the scaling factor. In another embodiment, key characteristics of the signal such as central frequency, frequency band, etc., are calculated downhole and transmitted to the surface. These key characteristics are then used to reconstruct the reference signal which is then used for correlation of surface detected signals. Once this correlation is done, the data are analyzed at the surface using known techniques.

The Dubinsky patent addresses the problem of telemetry of source wavelets to the surface in the context of a reverse VSP. The present disclosure is modification of the apparatus and method of Dubinsky in the context of a conventional VSP, i.e., source at the surface and receiver downhole. There are other differences between the method and apparatus of the present disclosure and the teachings of Dubinsky. These are discussed below.

SUMMARY OF THE DISCLOSURE

One embodiment of the disclosure is a method of seismic surveying of an earth formation. The method includes generating a first signal at a first time at a first location and propagating a seismic wave through the earth formation, the first signal being defined at least in part by a measurement of the first time by a clock at the first location. The method further includes receiving a second signal comprising a direct arrival of the first propagating seismic wave at a bottomhole assembly at a first depth, and determining from the first signal, the second signal, and a time of arrival of the first signal on a downhole clock a propagation time for the propagating seismic wave from the first location to the bottom hole assembly. The first signal may include a plurality of patterns, and each pattern may further include a plurality of pulses. Determination of the propagation time may further include filtering the second signal. The determination of the propagation time may further include partitioning the second signal into a plurality of patterns, each of the partitioned plurality of patterns corresponding to one of the plurality of patterns of the first signal, cross-correlating each of the plurality of partitioned patterns and the corresponding one of the plurality of patterns of the first signal to produce a plurality of cross-correlated signals, and combining the plurality of cross-correlated signals to produce an output signal. Determination of the propagation time may further include partitioning the second signal into a plurality of patterns each of the partitioned plurality of patterns corresponding to one of the plurality of patterns of the first signal, combining the plurality of partitioned patterns, and cross-coordinating the combination of partitioned patterns and the first signal to produce an output signal. The method may further include determining a quality factor and transmitting the quality factor to the first location, determining a first break from the output signal and transmitting the first break to the first location and/or synchronizing the clock at the first location and a downhole clock. That method may further comprise conveying the bottomhole assembly into the borehole on a drilling tubular. The method may further include generating an additional signal at the first location and propagating a second seismic wave into the formation, receiving a second additional signal at the bottom hole assembly at the first depth, the second additional signal including a reflection of the second seismic wave from an interface in the earth formation, and using this second additional signal and the determined propagation time to provide an image of the earth formation.

Another embodiment of the disclosure is a system for seismic surveying of an earth formation. The system includes a seismic source configured to generate a first signal at a first time at a first location and propagate a seismic wave through the earth formation, the first signal being defined at least in part by a measurement of the first time by a clock at the first location. The system further includes a receiver on a bottomhole assembly at a first depth in a borehole configured to receive a second signal comprising a direct arrival of the first propagating seismic wave, and a processor configured to determine from the second signal, the first signal and a time of arrival of the first signal on a downhole clock a propagation time of the propagating seismic wave from the first location to the bottomhole assembly. The first signal may include a plurality of patterns and each of the patterns may include a plurality of pulses. The processor may be further configured to determine the propagation time by filtering the second signal. The processor may be further configured to determine the propagation time by partitioning the second signal into a plurality of patterns, each of the partitioned plurality of patterns corresponding to one of the plurality of patterns of the first signal, cross-correlating each of the plurality of partitioned patterns and the corresponding one of the plurality of patterns of the first signal to produce a plurality of cross-correlated signals, and combining the plurality of cross-correlated signals to produce an output signal. The processor may be configured to determine the propagation time by partitioning the second signal into a plurality of patterns, each of the partitioned plurality of patterns corresponding to one of the plurality of patterns of the first signal, combining the plurality of partitioned patterns, and cross-correlating the combination of partitioned patterns and the first signal to produce an output signal. The processor may be further configured to determine a quality factor from the output signal and transmit the quality factor the first location, determine a first break from the output signal and transmit the first break to the first location and/or synchronize the clock at the first location and the downhole clock. The system may further include a drilling tubular configured to convey the bottomhole assembly into the borehole. The source may be further configured to generate an additional signal at the first location, and the receiver may further be configured to receive a second additional signal with a bottomhole assembly at the first depth the second additional signal including a reflection from an interface in the earth formation, and the processor may be further configured to use the second additional signal and the determined propagation time to provide an image of the earth formation. The first location may be at a surface location and/or another borehole.

Another embodiment is a computer-readable medium for use with a system for seismic surveying of an earth formation. The system includes a seismic source configured to generate a first signal at a first time at a first location and propagate a first seismic wave through the earth formation and a receiver on a bottomhole assembly at a first depth in a borehole configured to receive a second signal that includes a direct arrival of the first propagating seismic wave. The medium includes instructions that enable a processor to estimate from the second signal, the first signal and a time of arrival of the first signal on a downhole clock a propagation time of the first propagating seismic wave from the first location to the bottom hole assembly. The medium may include a ROM, an EPROM, an EAROM, a Flash Memory, and/or an Optical disk

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

Figure 1:
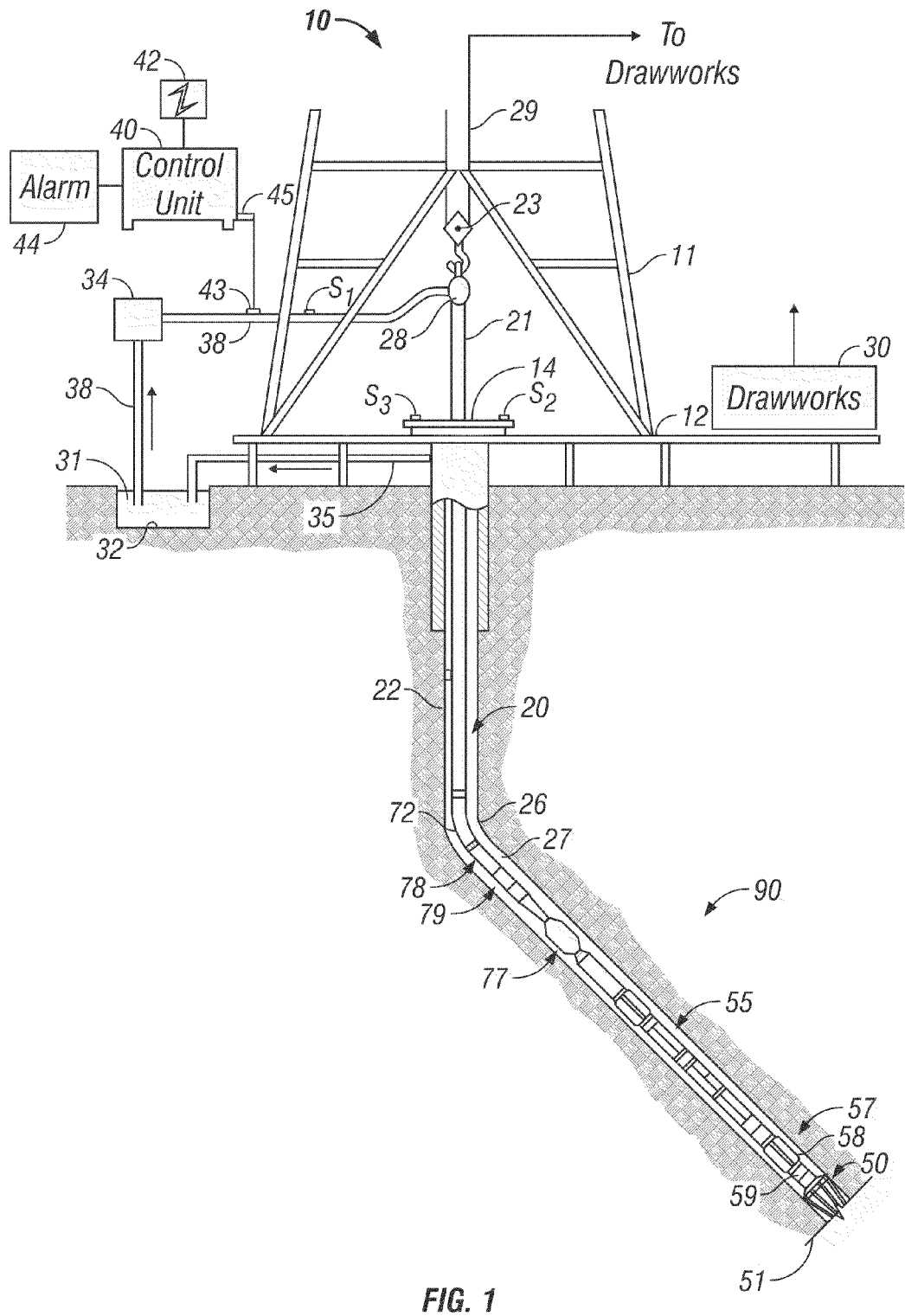
FIG. 1 shows a measurement-while-drilling device suitable for use with the present disclosure.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 can provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters can include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor at a suitable location (not shown) in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 can include a computer or a microprocessor-based processing system, memory for storing programs or models and data, a recorder for recording data, and other peripherals. The control unit 40 can be adapted to activate alarms 44 when certain unsafe or undesirable operating conditions occur.

The apparatus for use with the present disclosure also includes a downhole processor that may be positioned at any suitable location within or near the bottom hole assembly. The use of the processor is described below.

Figure 2:
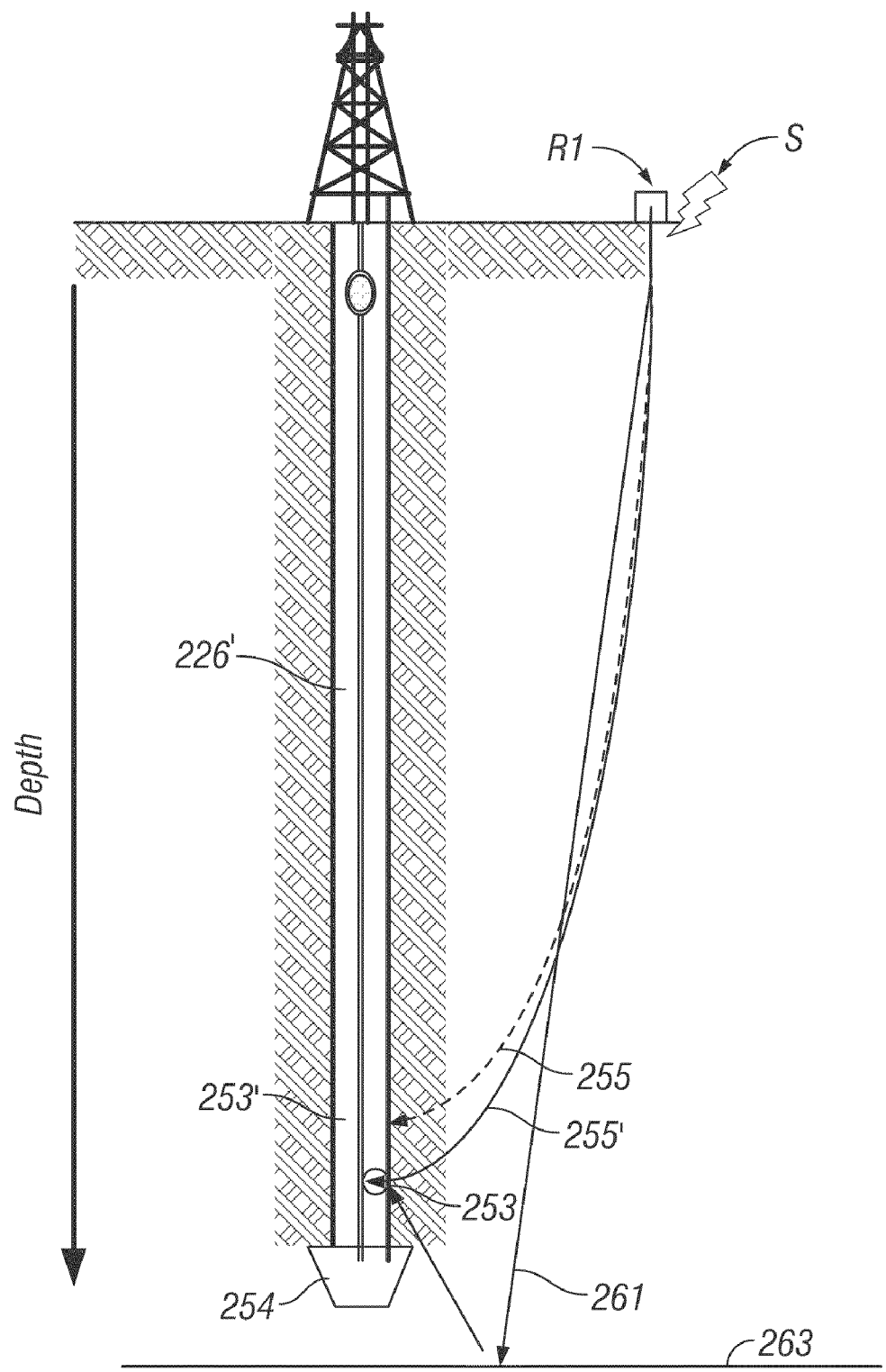
FIG. 2 illustrates the arrangement of source and sensors for the present disclosure.

Turning now to FIG. 2, an example is shown of source and receiver configurations for the method of the present disclosure. Shown is a drillbit 254 near the bottom of a borehole 226'. A surface seismic source is denoted by S and a reference receiver at the surface is denoted by R1. A downhole receiver is denoted by 253, while 255 shows an exemplary raypath for seismic waves originating at the source S and received by the receiver 53. The receiver 253 is usually in a fixed relation to the drillbit in the bottom hole assembly. Also shown in FIG. 2 is a raypath 255' from the source S to another position 253' near the bottom of the borehole. This other position 253' could correspond to a second receiver in one embodiment of the disclosure wherein a plurality of seismic receivers are used downhole. In an alternate embodiment of the disclosure, the position 253' corresponds to another position of the receiver 253 when the drillbit and the BHA are at a different depth.

Raypaths 255 and 255' are shown as curved. This raybending commonly happens due to the fact that the velocity of propagation of seismic waves in the earth generally increases with depth. Also shown in FIG. 2 is a reflected ray 261 corresponding to seismic waves that have been produced by the source, reflected by an interface such as 263, and received by the receiver at 253.

Figure 3:
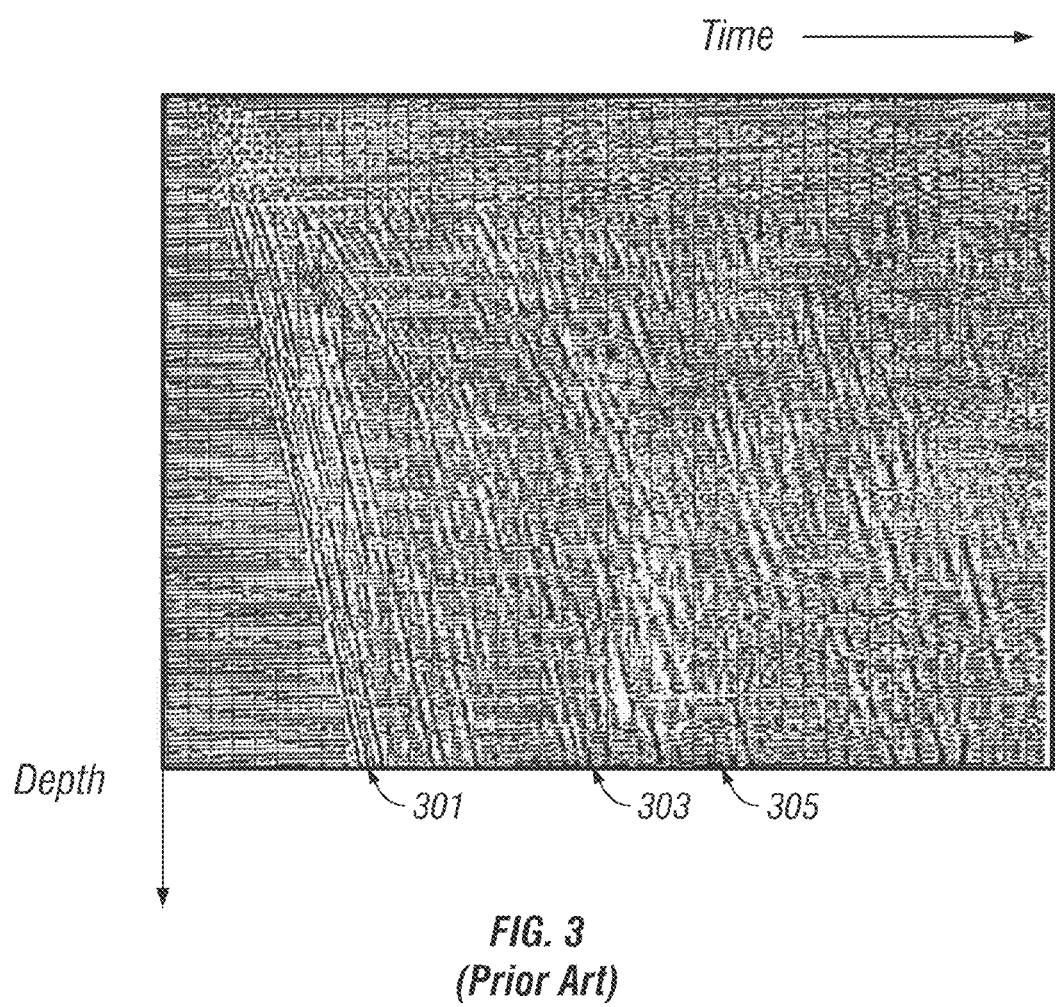
FIG. 3 (Prior Art) shows an example of a vertical seismic profile.

An example of a VSP that would be recorded by such an arrangement is shown in FIG. 3. The vertical axis corresponds to depth while the horizontal axis corresponds to time. The exemplary data in FIG. 3 was obtained using a wireline for deployment of the receivers. Measurements were made at a large number of depths, providing the large number of seismic traces shown in FIG. 3.

Even to an untrained observer, several points are apparent in FIG. 3. One point of interest is the direct compressional wave (P-wave) arrival denoted by 301. This corresponds to energy that has generally propagated into the earth formation as a P-wave. Also apparent in FIG. 3 is a direct shear wave (S-wave) arrival denoted by 303. Since S-waves have a lower velocity of propagation than P-waves, their arrival times are later than the arrival times of P-waves.

Both the compressional and shear wave direct arrivals are of interest since they are indicative of the type of rock through which the waves have propagated. To an experienced observer, other visual information is seen in FIG. 3. An example of this is denoted by 305 and corresponds to energy that is reflected from a deeper horizon, such as 263 in FIG. 2 and moves up the borehole. Consequently, the "moveout" of this is opposite too the moveout of the direct arrivals (P- or S-). Such reflections are an important part of the analysis of VSP data since they provide the ability to look ahead of the drillbit.

An important aspect of VSP acquisition and interpretation is that of determining the first breaks in absolute time. The term "first break" the first to the travel time between the activation of the surface sources and its arrival at a downhole location. The disclosed signal gathering and processing scheme is applied in a VSP-WD measurement. In such a measurement an impulsive surface seismic source S in FIG. 2 (air gun, explosives) generates a seismic signal propagating through the earth and received downhole in a wellbore by means of adequate receivers (geophone, hydrophone, accelerometer, or others).

Figure 4A:
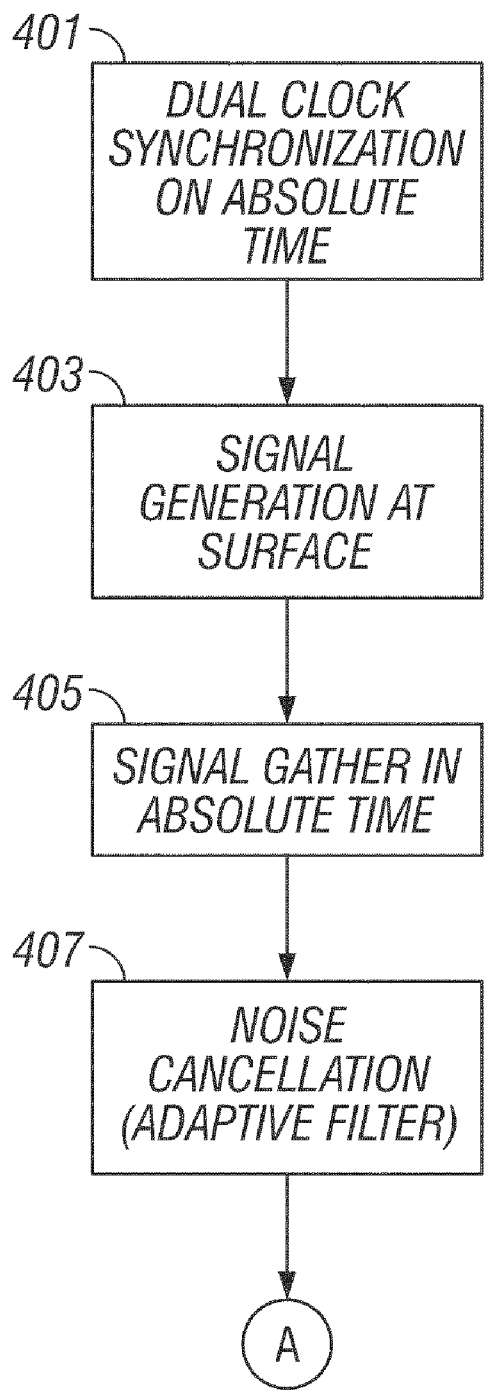
FIGS. 4A-4C shows a flow chart of processing carried out with one embodiment of the present disclosure.

In the measurement system, a unified time reference system is used. Specifically, a high precision clock is synchronized with a surface clock (e.g. by GPS synchronization) and deployed downhole. This is denoted by 401 in FIG. 4A. By this it is ensured that the same time basis is present both up- and downhole (accuracy>sample rate). The downhole clock is used to timestamp the recorded signals. The surface source is used to generate, at fixed intervals, a predetermined signal unique in time 403. This may be referred to as the "first signal". This means, the source generates a signal pattern incorporating several pulses arranged in a way unique for a dedicated time of the day. An example of such a pattern is shown by 501, 503, 505, 505 in FIG. 5. In this example each pattern has a length of 30 seconds and comprises 4 individual pulses (shots). The arrangement of these pulses in time within the pattern is unique. The patterns are repetitively fired at predetermined absolute times (e.g., 12:00:00, 12:00:30, 12:01:00, and 12 h:01 m:30 s in FIG. 5). Thus, the first signal is determined in part by a clock time at the surface location.

Figure 5:
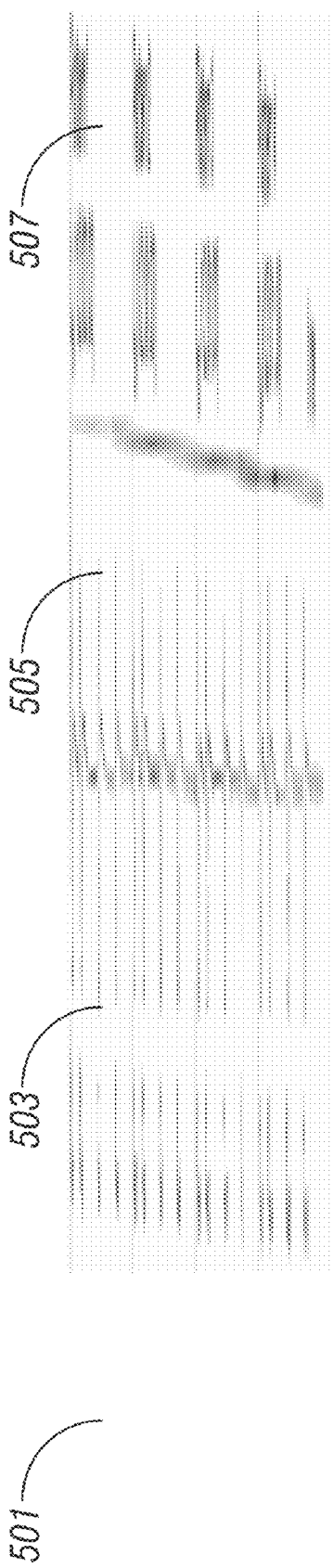
FIG. 5 shows an example of a pattern of surface signals.
Figure 6:
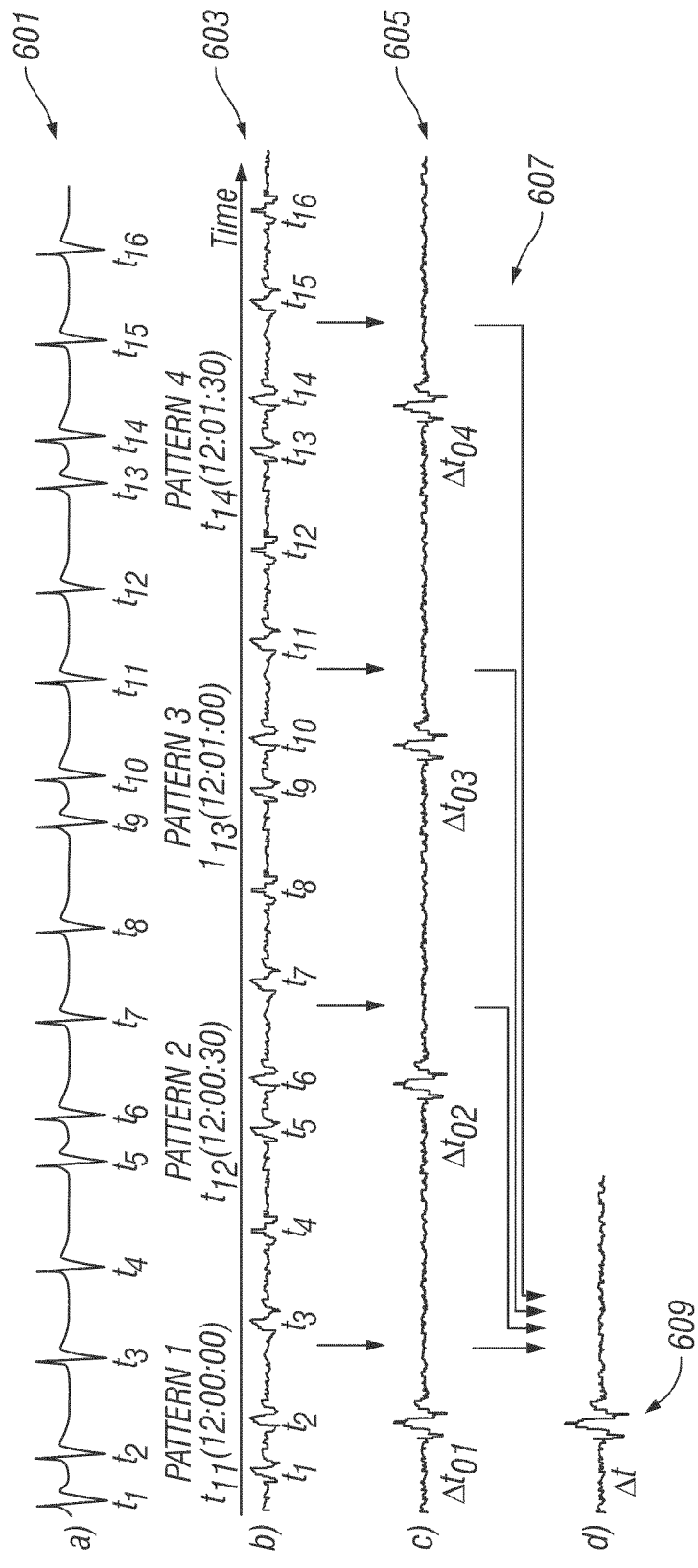
FIGS. 6A-6D illustrates the use of shot stacking.

After the receiver is moved to another station or after a longer period of time, the shot pattern within the firing sequence is rearranged (after 2 minutes in FIG. 5). The shot pattern, the pattern length, and the (absolute) firing times are defined prior to data acquisition and stored in a surface and downhole memory. Hence the pattern that is generated on the surface, its absolute time, and number of repetitions is known to the surface processor and the downhole processor. Thus, the whole signal structure is known and only the travel time between source and receiver needs to be determined.

The seismic wave propagated by generation of the first signal at the surface at a predetermined time is recorded downhole 405 by means of dedicated receivers. The recorded signal may be referred to as the "second signal". The second signal has a time stamp associated with it corresponding to the downhole clock. Initial noise analysis, e.g. by adaptive noise filtering, is used for background noise removal 407.

Figure 4B:
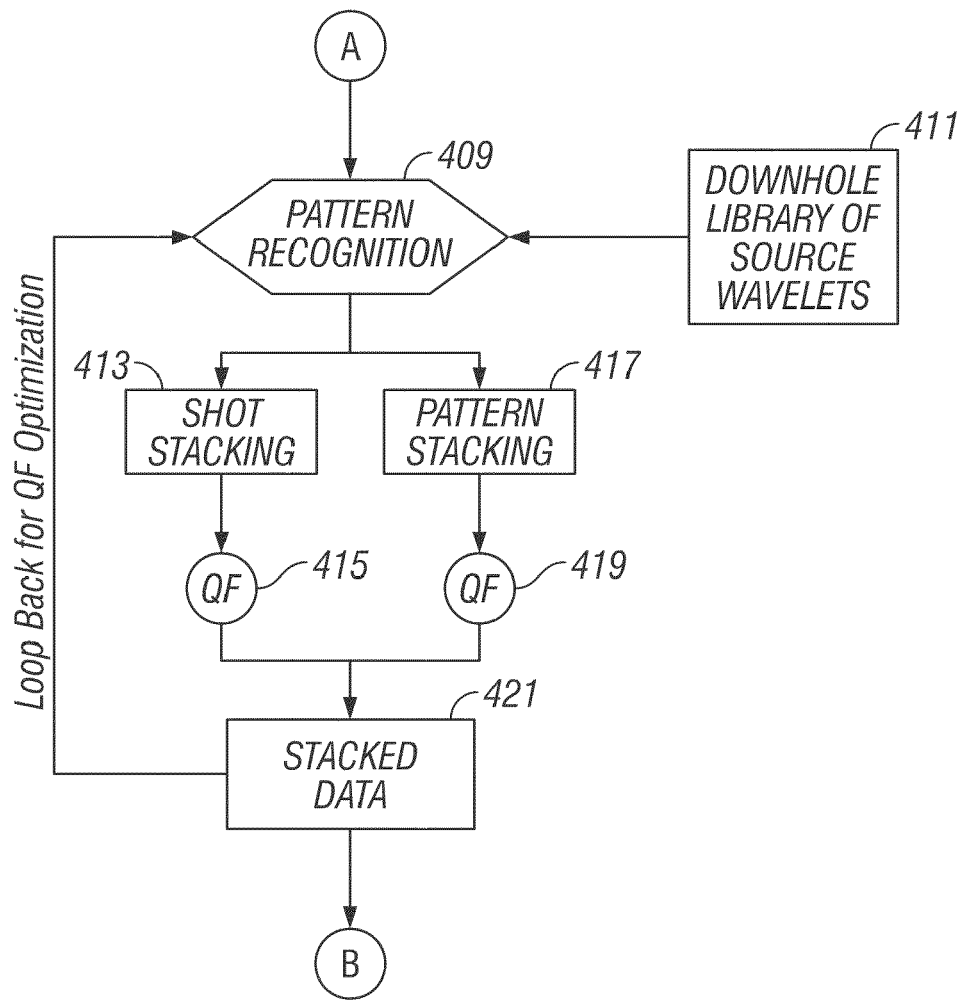
Figure 4C:
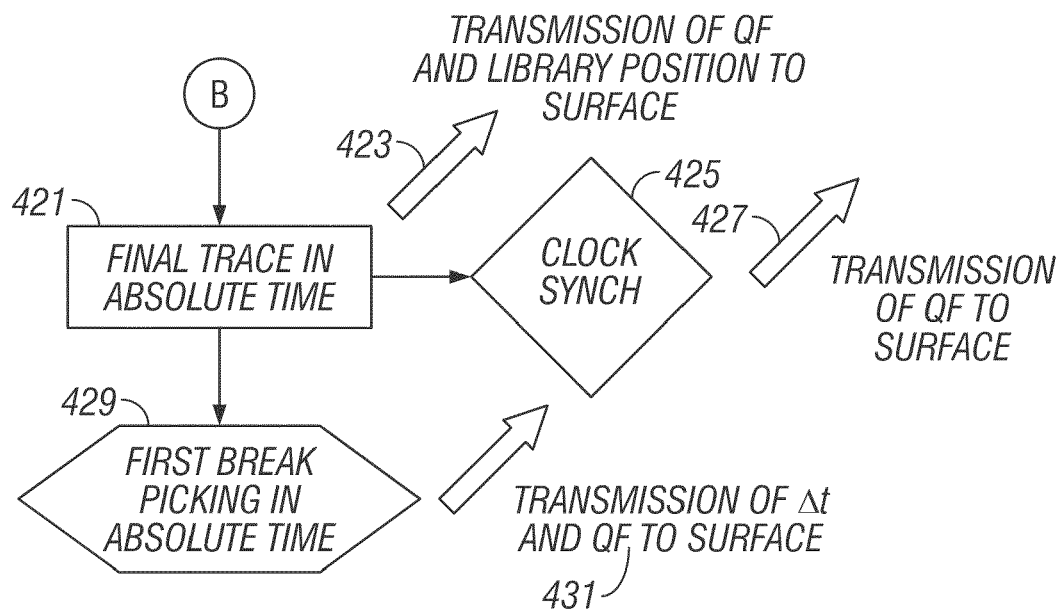

In a closed loop pattern recognition procedure, a self-improving algorithm identifies the source pattern in the recorded data by means of crosscorrelation or other methods considering the source pattern library stored downhole. This is illustrated in FIG. 4B. Processing may be done for each receiver component (x, y, z) for multicomponent recording or for receiving system (geophone, hydrophone, accelerometer, or others) when different types of detectors are used. Using the information of the downhole library in the downhole memory 411, the earliest possible arrival time (=shot time) and the pattern arrangement, it is possible to extract the pattern information 409 out of the recorded data. An example is shown in FIGS. 6(a)-(d) where 601 shows the source signal. 603 shows the source signal split up into 4 patterns labeled as Pattern 1-Pattern 4.

In shot stacking 413, all individual shots within one pattern are stacked with respect to the first break of the whole trace (c to d in FIG. 6), assuming there is no change in the source wavelet structure. The time bases for the stacking procedure are the relative arrival times within each pattern, i.e. $t_5$ is at the same position within pattern 2 as $t_1$ within pattern 1 and as $t_9$ within pattern 3 etc. 605 shows the relative arrival times within each pattern. The resulting shot stacked pattern of 605 is stacked again 607 for further SNR enhancement and is denoted by 609. The quality of this procedure is determined by means of a quality factor (QF) 415, depending on the total SNR of the final stack. The whole procedure is repeated with varying move-out times around the initial shot pattern identification until the SNR reaches a maximum.

Figure 7:
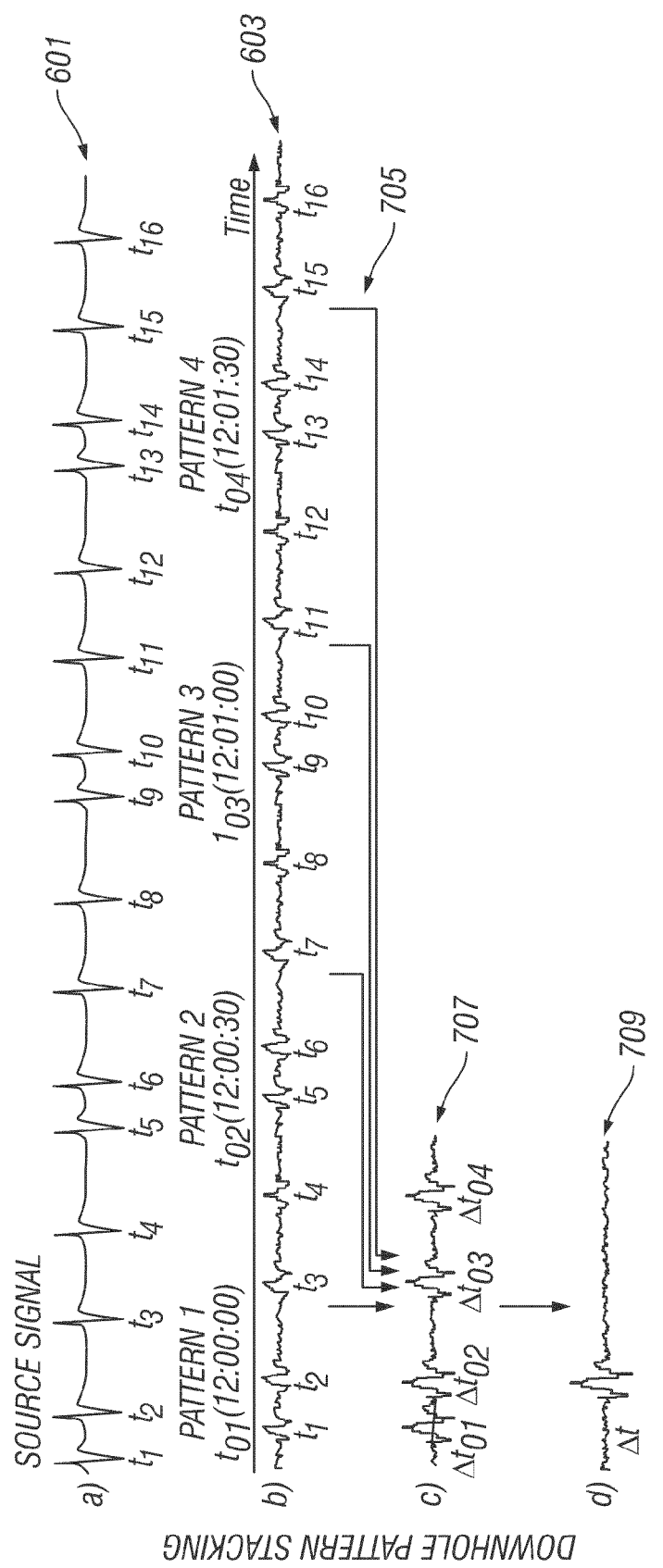
FIGS. 7A-7D illustrates the use of pattern stacking.

The pattern stacking procedure 417 is pretty much the same as shot stacking but the order of processing is different. After the pattern identification all pattern with the same shot sequence (603 in FIG. 7) are stacked 705 with respect to the pattern starting times ($t_{01}$, $t_{02}$, etc.). The individual shots within the resulting stack 707 are stacked again for further SNR enhancement to give the trace denoted by 709. The quality of this procedure is determined by means of a quality factor 419 which depends on the total SNR of the final stack. The whole procedure is repeated with varying move-out times with either shot stacking or with pattern stacking around the initial shot pattern identification until the SNR reaches a maximum. This is denoted by the loop back from 421 to 409.

After the optimal stacks are found in absolute time 421, the time, the quality factors and the library position of the identified pattern are transmitted to the surface for source wavelet cross-check 423. The final trace 421, with enhanced SNR in absolute time, is now analyzed for the accurate first arrival time 429, which is then transmitted to the surface 431. A factor indicating the picking accuracy is also transmitted.

The association of dedicated shot pattern to an absolute time also allows one to check the downhole clocks accuracy versus the surface time reference system by comparing 425 the identified wavelet-time pairs with the pairs stored in the downhole library and also the actual clock time. A quality factor indicating the respective clock accuracy is also transmitted to the surface 427.

Once the shot break (propagation time) has been determined, additional seismic acquisition is carried out using known methods with the surface source for obtaining a vertical seismic profile (VSP). For the VSP, the source is not limited to the patterns or pulses described above and may include swept-frequency signals. Specifically, the VSP data will involve longer propagation times (from deeper interfaces) than the first break. Hence the bandwidth of the surface source may need to be designed with this in mind. However, the acquisition of the VSP data would still be carried with receivers at a plurality of depths, and the processing of the VSP data would use the first break time determined using the method described above. Standard operations, like producing an image of the earth formation, may be done. The term "interface" is intended to include formation bed boundaries as well as fluid interfaces in an otherwise homogenous medium.

The present disclosure has been described in the context of VSP data acquisition in which a seismic source is at or near a surface location. However, the disclosure could also be used when the seismic source is located in a preexisting wellbore. With such an arrangement, crosswell measurements could be made during the process of drilling a wellbore. Based on these crosswell measurements, the position of the wellbore being drilled from a preexisting wellbore can be determined and, based on the determined distance, the drilling direction of the wellbore can be controlled.

The operation of the sources and receivers, and the control of the drilling direction may be controlled by a downhole processor and/or a surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The term "processor" as used herein is intended to include Field Programmable Gate Arrays (FPGAs).

While the foregoing disclosure is directed to the preferred embodiments of the disclosure, various modifications will be apparent to those skilled in the art. It is intended that all such variations within the scope and spirit of the appended claims be embraced by the foregoing disclosure.

What is claimed is:

1. A method of seismic surveying of an earth formation, the method comprising:
   (a) generating a first signal at a first time at a first location and propagating a first seismic wave through the earth formation, the first signal being defined at least in part by a measurement of the first time and comprising a plurality of patterns, each pattern comprising a plurality of pulses;
   (b) receiving a second signal comprising a direct arrival of the first propagating seismic wave on a bottomhole assembly (BHA) at a first depth;
   (c) determining from the second signal, the first signal and a time of arrival of the first signal on a downhole clock a propagation time for the propagating seismic wave from the first location to the BHA, wherein determining the propagation time includes producing an output signal by:
  (i) partitioning the second signal into a plurality of patterns, each of the partitioned plurality of patterns corresponding to one of the plurality of patterns of the first signal,
  (ii) cross-correlating the partitioned patterns of the first and second signals, and
  (iii) combining the partitioned patterns of the first and second signals.

2. The method of claim 1 wherein determination of the propagation time further comprises filtering the second signal.

3. The method of claim 1 wherein producing the output signal further comprises:
  (i) cross-correlating each of the plurality of partitioned patterns and the corresponding one of the plurality of patterns of the first signal to produce a plurality of cross-correlated signals, and
  (ii) combining the plurality of cross-correlated signals to produce an output signal.

4. The method of claim 1 wherein producing the output signal further comprises:
  (i) combining the plurality of partitioned patterns, and
  (ii) cross-correlating the combination of partitioned patterns and the first signal to produce an output signal.

5. The method of claim 3 further comprising performing at least one of:
  (A) determining a quality factor from the output signal and transmitting the quality factor to the first location;
  (B) determining a first break from the output signal and transmitting the first break to the first location, and
  (C) synchronizing a clock used to measure the first time and the downhole clock.

6. The method of claim 4 further comprising performing at least one of:
  (A) determining a quality factor from the output signal and transmitting the quality factor to the first location;
  (B) determining a first break from the output signal and transmitting the first break to the first location, and
  (C) synchronizing a clock used to measure the first time and the downhole clock.

7. The method of claim 1 further comprising conveying the BHA into the borehole on a drilling tubular.

8. The method of claim 1 further comprising:
  (i) generating an additional signal at the first location and propagating a second seismic wave into the formation,
  (ii) receiving a second additional signal at the BHA at the first depth, the second additional signal including a reflection of the second seismic wave from a boundary in the earth formation, and
  (iii) using the second additional signal and the determined propagation time to provide an image of the earth formation.

9. A system for seismic surveying of an earth formation, the system comprising:
  (a) a seismic source configured to generate a first signal at a first time at a first location and propagate a first seismic wave through the earth formation, the first signal being defined at least in part by a measurement of the first time and comprising a plurality of patterns, each pattern comprising a plurality of pulses;
  (b) a receiver on a bottomhole assembly (BHA) at a first depth in a borehole configured to receive a second signal comprising a direct arrival of the first propagating seismic wave; and
  (c) a processor configured to determine from the second signal, the first signal and a time of arrival of the first signal on a downhole clock a propagation time of the first propagating seismic wave from the first location to the BHA, wherein determining the propagation time includes producing an output signal, by:
    (i) partitioning the second signal into a plurality of patterns, each of the partitioned plurality of patterns corresponding to one of the plurality of patterns of the first signal,
    (ii) cross-correlating the partitioned patterns of the first signal and the second signals, and
    (iii) combining the partitioned patterns of the first and second signals signals.

10. The system of claim 9 wherein the processor is further configured to determine the propagation time by filtering the second signal.

11. The system of claim 9 wherein the processor is further configured to produce the output by:
  (i) cross-correlating each of the plurality of partitioned patterns and the corresponding one of the plurality of patterns of the first signal to produce a plurality of cross-correlated signals, and
  (ii) combining the plurality of cross-correlated signals to produce an output signal.

12. The system of claim 9 wherein the processor is further configured to produce the output by:
  (i) combining the plurality of partitioned patterns, and
  (ii) cross-correlating the combination of partitioned patterns and the first signal to produce an output signal.

13. The system of claim 11 wherein the processor is further configured to perform at least one of:
  (A) determine a quality factor from the output signal and transmit the quality factor to the first location;
  (B) determine a first break from the output signal and transmit the first break to the first location, and
  (C) synchronize used to measure the first time and the downhole clock.

14. The system of claim 12 wherein the processor is further configured to perform at least one of:
  (A) determine a quality factor from the output signal and transmit the quality factor to the first location;
  (B) determine a first break from the output signal and transmit the first break to the first location, and
  (C) synchronize used to measure the first time and the downhole clock.

15. The system of claim 9 further comprising a drilling tubular configured to convey the BHA into the borehole.

16. The system of claim 9 wherein:
  (i) the source is further configured to generate an additional signal at the first location,
  (ii) the receiver is further configured to receive a second additional signal with the BHA at the first depth, the second additional signal including a reflection from an interface in the earth formation, and
  (iii) the processor is further configured to use the second additional signal and the determined propagation time to provide an image of the earth formation.

17. The system of claim 9 wherein the first location is at one of: (i) a surface location, and (ii) another borehole.

18. A computer-readable medium for use with a system for seismic surveying of an earth formation, the system comprising:
  (a) a seismic source configured to generate a first signal at a first time at a first location and propagate a first seismic wave through the earth formation, the first signal being defined at least in part by the first time and comprising a plurality of patterns, each pattern comprising a plurality of pulses;

(b) a receiver on a bottomhole assembly (BHA) at a first depth in a borehole configured to receive a second signal comprising a direct arrival of said first propagating seismic wave;

the medium comprising instructions that enable a processor to:

(c) estimate from the second signal, the first signal and a time of arrival of the first signal on a downhole clock a propagation time of the propagating seismic wave from the first location to the BHA, wherein estimating the propagation time comprises producing an output signal by:

(i) partitioning the second signal into a plurality of patterns, each of the partitioned plurality of patterns corresponding to one of the plurality of patterns of the first signal, (ii) cross-correlating the partitioned patterns of the first signal and the second signals, and (iii) combining the partitioned patterns of the first and second signals.

19. The medium of claim 18 further comprising at least one of (i) a ROM, (ii) an EPROM, (iii) an EAROM, (iv) a Flash Memory, and (v) an Optical disk.

* * * * *

UNITED STATES PATENT AND TRADEMARK OFFICE
CERTIFICATE OF CORRECTION

PATENT NO.         : 7,633,834 B2                                           Page 1 of 1
APPLICATION NO.    : 11/937412
DATED              : December 15, 2009
INVENTOR(S)        : Mathiszik et al.

It is certified that error appears in the above-identified patent and that said Letters Patent is hereby corrected as shown below:

Column 10, claim 13, line 37, delete "synchronize", insert --synchronize a clock--; and Column 10, claim 14, line 45, delete "synchronize", insert --synchronize a clock--.

Signed and Sealed this

Second Day of February, 2010

David J. Kappos
*Director of the United States Patent and Trademark Office*